(12) United States Patent
Maltsev et al.

(10) Patent No.: US 7,649,861 B2
(45) Date of Patent: Jan. 19, 2010

(54) MULTIPLE ANTENNA MULTICARRIER COMMUNICATION SYSTEM AND METHOD WITH REDUCED MOBILE-STATION PROCESSING

(75) Inventors: Alexander A. Maltsev, Nizhny Novgorod (RU); Andrey V. Pudeyev, Nizhny Novgorod (RU); Ali S. Sadri, San Diego, CA (US); Sumeet Sandhu, San Jose, CA (US); Sergey A. Tiraspolsky, Nizhny Novgorod (RU); Alexei V. Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 10/999,592

(22) Filed: Nov. 30, 2004

(65) Prior Publication Data

US 2006/0114816 A1 Jun. 1, 2006

(51) Int. Cl.
*H04J 11/00* (2006.01)
*H04J 1/00* (2006.01)

(52) U.S. Cl. ............... 370/328; 370/203; 370/208; 370/210; 375/299; 375/346

(58) Field of Classification Search ........... 375/348, 375/350, 232, 130, 267, 347, 260, 299, 346, 375/349, 235; 455/101–103, 562.1; 370/348, 370/328, 203, 210, 208, 204, 480, 329, 334; 333/18, 166
See application file for complete search history.

(56) References Cited

U.S. PATENT DOCUMENTS

| | | | |
|---|---|---|---|
| 6,141,393 A * | 10/2000 | Thomas et al. | 375/347 |
| 6,396,886 B1 * | 5/2002 | Kapoor | 375/350 |
| 6,473,467 B1 | 10/2002 | Wallace et al. | |
| 7,068,981 B2 * | 6/2006 | Sim | 455/101 |
| 7,092,436 B2 * | 8/2006 | Ma et al. | 375/229 |
| 7,123,887 B2 * | 10/2006 | Kim et al. | 455/103 |
| 7,139,340 B2 * | 11/2006 | Scarpa | 375/344 |
| 2001/0033352 A1 | 10/2001 | Park et al. | |

(Continued)

FOREIGN PATENT DOCUMENTS

EP 1416688 A1 5/2004

(Continued)

OTHER PUBLICATIONS

"International Search Report for corresponding PCT Application No. PCT/US2005/042319", (Mar. 22, 2006), 4 pgs.

(Continued)

*Primary Examiner*—George Eng
*Assistant Examiner*—Brandon J Miller
(74) *Attorney, Agent, or Firm*—Schwegman, Lundberg & Woessner, P.A.; Gregory J. Gorrie

(57) ABSTRACT

In a multiple-input multiple-output (MIMO) multicarrier communication system, a mobile station sends a quantized time-domain representation of the channel transfer function to a base station for use by the base station in generating beamforming coefficients for use in subsequent transmissions to the mobile station. In some embodiments, the quantized time-domain representation of the channel transfer function may be generated from selected most significant rays of an initial estimated sampled channel impulse response. Other embodiments may be described and claimed.

20 Claims, 4 Drawing Sheets

U.S. PATENT DOCUMENTS

| | | | |
|---|---|---|---|
| 2001/0033622 A1* | 10/2001 | Jongren et al. | 375/267 |
| 2002/0051433 A1 | 5/2002 | Affes et al. | |
| 2002/0154716 A1* | 10/2002 | Erving et al. | 375/348 |
| 2003/0036359 A1* | 2/2003 | Dent et al. | 455/63 |
| 2003/0095508 A1* | 5/2003 | Kadous et al. | 370/252 |
| 2003/0128658 A1* | 7/2003 | Walton et al. | 370/208 |
| 2003/0181170 A1 | 9/2003 | Sim | |
| 2003/0185179 A1* | 10/2003 | Inogai et al. | 370/335 |
| 2003/0232601 A1* | 12/2003 | Uno | 455/67.11 |
| 2004/0002364 A1* | 1/2004 | Trikkonen et al. | 455/562.1 |
| 2004/0087324 A1 | 5/2004 | Ketchum et al. | |
| 2004/0120409 A1* | 6/2004 | Yasotharan et al. | 375/260 |
| 2004/0120411 A1 | 6/2004 | Walton et al. | |
| 2005/0047518 A1* | 3/2005 | Auer | 375/267 |
| 2005/0111538 A1* | 5/2005 | Wernaers | 375/229 |
| 2005/0243937 A1* | 11/2005 | Legouable et al. | 375/260 |
| 2005/0287978 A1 | 12/2005 | Maltsev et al. | |
| 2006/0072677 A1 | 4/2006 | Kwak et al. | |
| 2006/0092054 A1 | 5/2006 | Li et al. | |
| 2006/0105767 A1 | 5/2006 | Kim | |
| 2006/0120469 A1 | 6/2006 | Maltsev et al. | |
| 2006/0258403 A1 | 11/2006 | Vaidyanathan | |

FOREIGN PATENT DOCUMENTS

| | | |
|---|---|---|
| TW | 474072 | 1/2002 |
| WO | WO-0117065 A1 | 3/2001 |
| WO | WO-2005/029804 | 3/2005 |
| WO | WO-2005/029804 A2 | 3/2005 |
| WO | WO-2006/007299 A1 | 1/2006 |
| WO | WO-2006/060241 | 6/2006 |
| WO | WO-2006/060241 A1 | 6/2006 |

OTHER PUBLICATIONS

Bangerter, B., et al., "Wireless Technologies: High-Throughput Wireless LAN Air Interface", *Intel Technology Journal*, 7(3), (Aug. 19, 2003), 47-57.

Jöngren, G., et al., "Utilizing Quantized Feedback Information In Orthogonal Space-Time Block Coding", *Proceedings of IEEE Global Telecommunication Conference*, (GLOBECOM '00), 2(4), (Nov. 27, 2000), 995-999.

Love, D. J., et al., "Grassmannian Beamforming for Multiple-Input Multiple-Output Wireless Systems", *IEEE Transactions on Information Theory*, 49(10), (Oct. 2003), 2735-2747.

Stephens, A. P., "IEEE 802.11 TGn Comparison Criteria", *IEEE 802.11-02/814r2*, (IEEE P802.11—Wireless LANs),(Nov. 2003), 5 pgs.

"U.S. Appl. No. 11/004,720 Response filed Jan. 23, 2008 to Non-Final Office Action mailed Nov. 28, 2007", 11 pgs.

"U.S. Appl. No. 11/004,720 Non-Final Office Action mailed Apr. 16, 2008", 16pgs.

"U.S. Appl. No. 11/004,720, Non-Final Office Action Mailed Nov. 28, 2007", 19 pgs.

"Taiwanese Application No. 94140545 Office Action mailed Nov. 30, 2007", 5 pgs.

"U.S. Appl. No. 11/004,720, Response filed Jul. 16, 2008 to Non-Final Office Action mailed Apr. 16, 2008", 13 pgs.

"U.S. Appl. No. 11/004,720, Final Office Action mailed Oct. 28, 2008", 14 pgs.

"International Application Serial No. PCTUS2005042319, Preliminary Report on Patentability, issued Jun. 5, 2007", 8 pgs.

"UK Application Serial No. 0705999.1, Office Action date Mar. 28, 2007", 13 pgs.

"U.S. Appl. No. 11/004,720 Preliminary Amendment filed Oct. 25, 2007", 7 pgs.

"U.S. Appl. No. 11/004,720 Response filed Jan. 21, 2009 to Final Office Action mailed Oct. 28, 2008", 13 pgs.

"U.S. Appl. No. 11/004,720, Advisory Action mailed Jan. 29, 2009", 3 pgs.

"U.S. Appl. No. 11/004,720, Non Final Office Action mailed Apr. 27, 2009", 17 pgs.

0705999.1, "United Kingdom Application serial No. 0705999.1 ,Office Action Mailed on Feb. 19, 2009", 15.

* cited by examiner

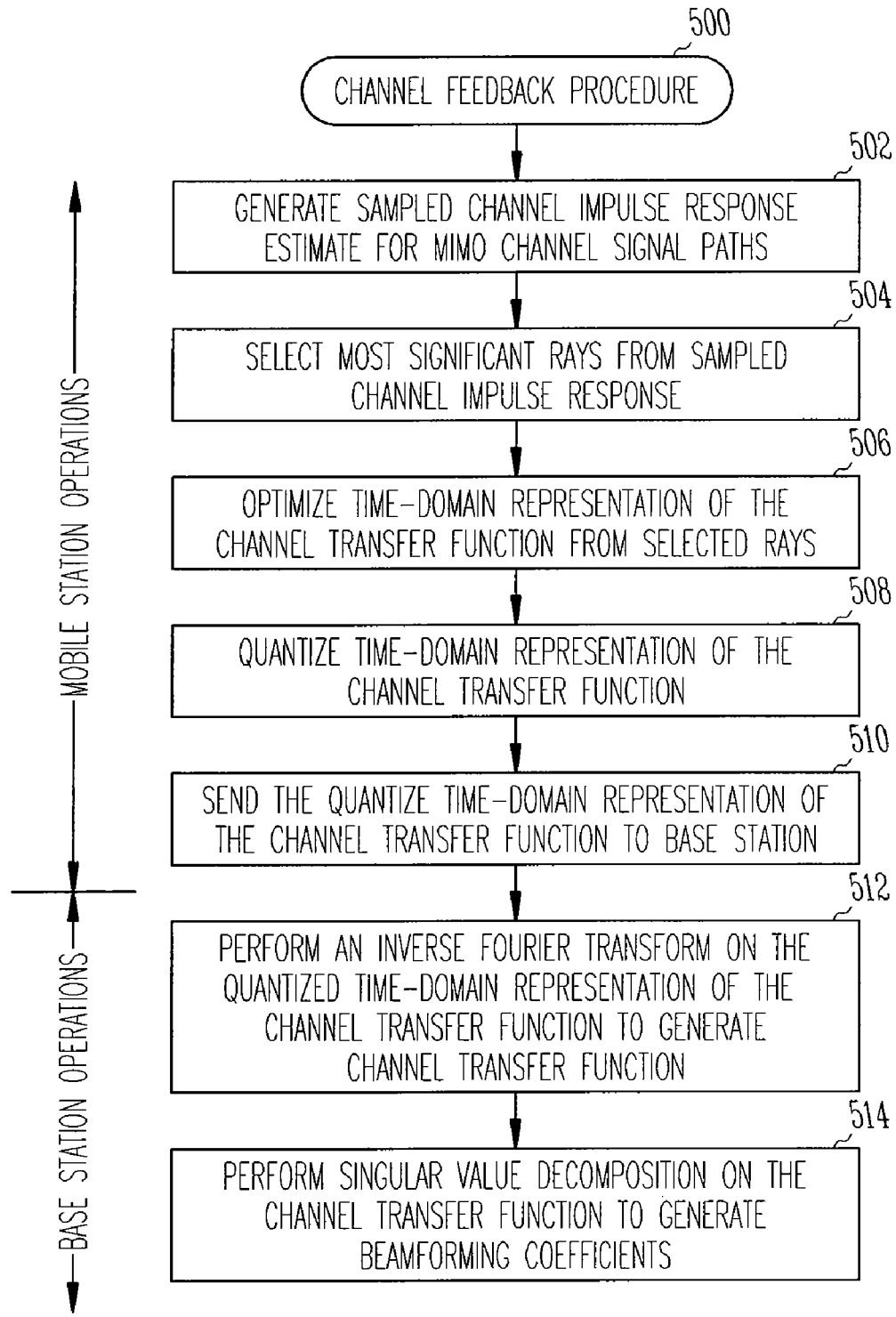

US 7,649,861 B2

MULTIPLE ANTENNA MULTICARRIER COMMUNICATION SYSTEM AND METHOD WITH REDUCED MOBILE-STATION PROCESSING

TECHNICAL FIELD

Embodiments of the present invention pertain to wireless multicarrier communications. Some embodiments pertain to multicarrier communications.

BACKGROUND

Many wireless communication systems use feedback to allow a transmitting station to adapt its transmissions to changing channel conditions. One problem with multicarrier communication systems that use many subcarriers, such as systems employing orthogonal frequency division multiplexed (OFDM) signals, is that the channel conditions may be different for each of the subcarriers or groups of the subcarriers. The amount of feedback to adapt to changing channel conditions may be significant; consuming bandwidth as well as using additional energy. This is especially a concern when multiple antennas are used to communicate additional data streams over the same subcarriers, as in the case of multiple-input, multiple-output (MIMO) systems. In battery-powered mobile units, this processing reduces battery life as well as increases the complexity of the mobile unit.

BRIEF DESCRIPTION OF THE DRAWINGS

FIG. 5 is a flow chart of channel feedback procedure in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
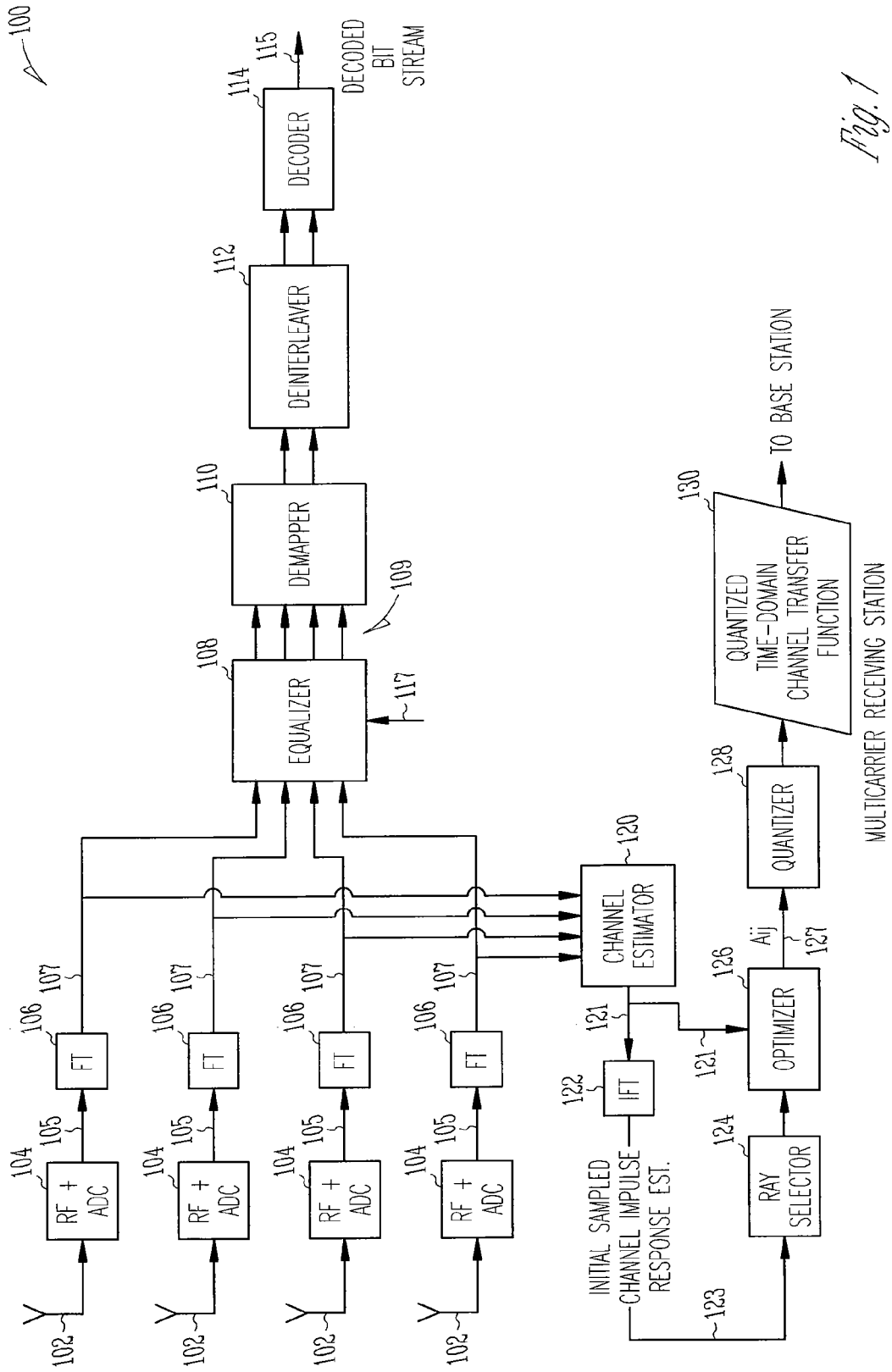
FIG. 1 is a block diagram of a multicarrier receiving station in accordance with some embodiments of the present invention.
Figure 2:
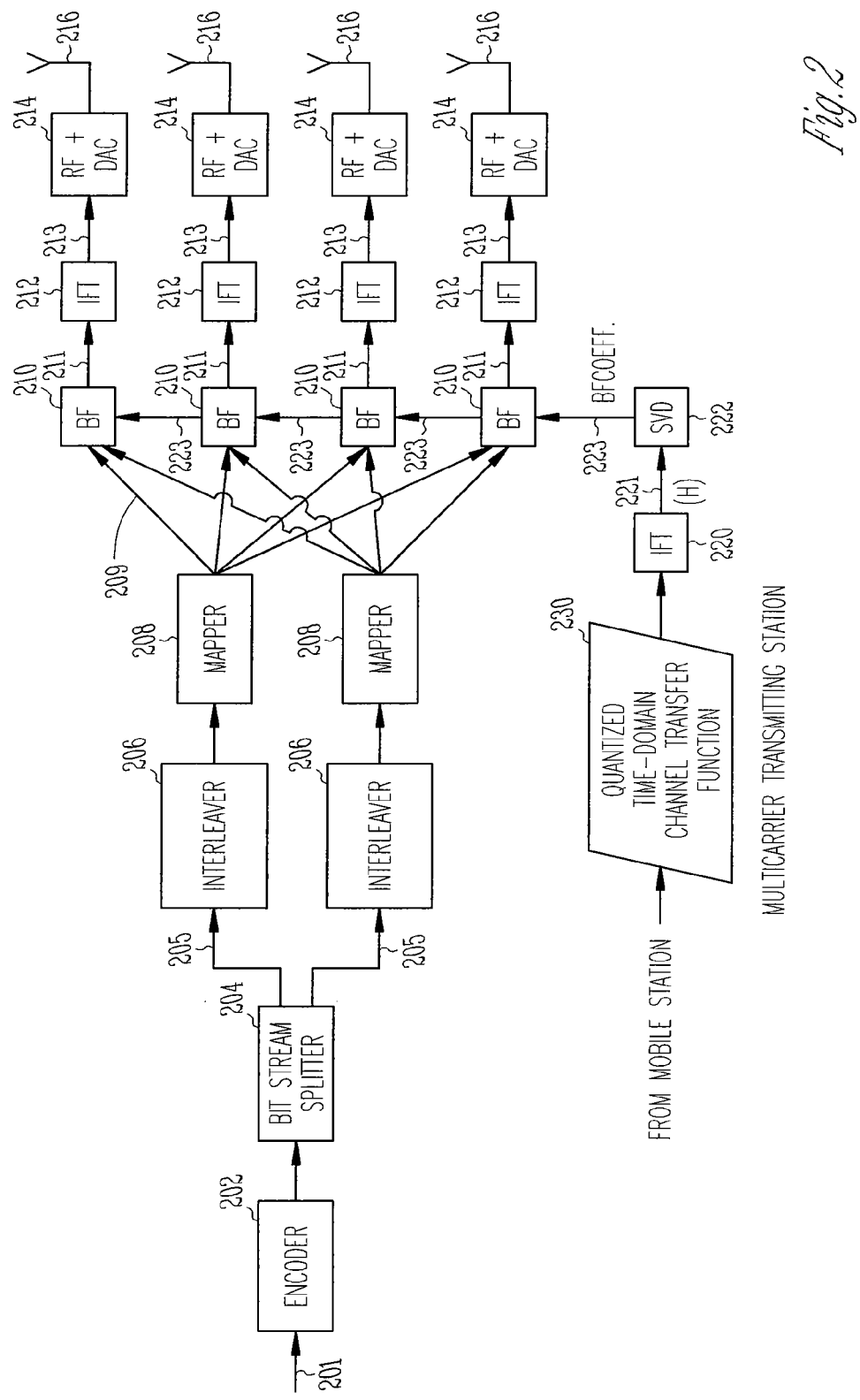
FIG. 2 is a block diagram of a multicarrier transmitting station in accordance with some embodiments of the present invention.

FIG. 1 is a block diagram of a multicarrier receiving station in accordance with some embodiments of the present invention. Multicarrier receiving station 100 may receive multicarrier communication signals using two or more of antennas 102 and may generate decoded bit stream 115. FIG. 2 is a block diagram of a multicarrier transmitting station in accordance with some embodiments of the present invention. Multicarrier transmitting station 200 may transmit multicarrier communication signals generated from bit stream 201 using two or more of antennas 216.

Referring to FIGS. 1 and 2, although not separately illustrated, multicarrier receiving station 100 may also include circuitry for transmitting multicarrier communication signals and multicarrier transmitting station 200 may also include circuitry for receiving multicarrier communication signals. In some embodiments, multicarrier receiving station 100 may be referred to as a mobile station and multicarrier transmitting station 200 may be referred to as a base station. In these embodiments, the base station may communicate with one or more mobile stations as part of a wireless network, such as wireless metropolitan area network (WMAN) or a wireless local area network (WLAN), although the scope of the invention is not limited in this respect. In some embodiments, multicarrier receiving station 100 and multicarrier transmitting station 200 may comprise a multiple-input multiple-output (MIMO) communication system using multiple transmit and/or multiple receive antennas to communicate one or more spatial data streams therebetween. Although multicarrier receiving station 100 and multicarrier transmitting station 200 are each illustrated as having four antennas and associated signal-path circuitry, the scope of the invention is not limited in this respect, as different numbers of antennas may also be used. Furthermore, there is no requirement that multicarrier receiving station 100 and multicarrier transmitting station 200 have the same number of antennas. In some WLAN embodiments, multicarrier transmitting station 200 may be referred to an access point (AP).

In accordance with some embodiments, a mobile station, such as receiving station 100, sends a quantized time-domain representation of the channel transfer function to a base station, such as transmitting station 200, for use by the base station in generating beamforming coefficients. The beamforming coefficients may be used for subsequent transmissions to the mobile station. In some embodiments, the quantized time-domain representation of the channel transfer function may be generated from selected most significant rays of an estimated sampled channel impulse response. These embodiments are described in more detail below.

Multicarrier receiving station 100 comprises radio-frequency (RF) and analog to digital conversion (ADC) circuitry 104 to convert multicarrier communication signals received through two or more of antennas 102 to digital signals 105. In some embodiments, RF and ADC circuitry 104 may remove a cyclic prefix from multicarrier packets, although the scope of the invention is not limited in this respect.

Multicarrier receiver station 100 also comprises Fourier transform (FT) circuitry 106 to perform Fourier transformations on digital signals 105 to generate frequency-domain samples 107. In some embodiments, Fourier transform circuitry 106 may perform a fast Fourier transform (FFT) on digital signals 105. In some embodiments, each of Fourier transform circuitry 106 may generate frequency-domain samples 107 associated with each of a plurality of subcarriers of a multicarrier communication signal.

Multicarrier receiving station 100 also comprises equalizer 108 to perform an equalization on frequency-domain samples 107 to generate equalized frequency-domain samples 109 based on channel estimates and other parameters 117. In some embodiments, equalizer 108 may allow the separation of one or more spatial data streams that may have been transmitted by a transmitting station, although the scope of the invention is not limited in this respect.

Multicarrier receiving station 100 also comprises demapper 110 to convert (i.e., demap) equalized frequency-domain samples 109 from symbols to bits. In some embodiments, demapper 110 may generate demapped bits for each spatial stream that was transmitted, although the scope of the invention is not limited in this respect.

Multicarrier receiving station 100 also comprises deinterleaver 112 to perform a deinterleaving operation on the demapped bits to generate one or more encoded bit streams. In some embodiments, deinterleaver 112 may be a block deinterleaver to deinterleave blocks of bits, although the scope of the invention is not limited in this respect.

Multicarrier receiving station 100 also comprises decoder 114 to perform a decoding operation on the one or more encoded bit streams provided by deinterleaver 112 to generate decoded bit stream 115. In some embodiments, decoder 114 may be a forward-error-correcting (FEC) decoder, while in other embodiments; decoder 114 may be convolutional decoder.

In accordance with some embodiments of the present invention, when operating as a mobile station, multicarrier receiving station 100 may send a quantized time-domain representation 130 of a channel transfer function to a base station for use by the base station. In some embodiments, the base station may use the quantized time-domain representation of the channel transfer function to generate beamforming coefficients for use in subsequent transmissions to multicarrier receiving station 100, although though the scope of the invention is not limited in this respect. In some embodiments, the channel transfer function may be a channel transfer function matrix (H) representing the channel transfer function of a MIMO channel defined by a plurality of receive and transmit antennas, although the scope of the invention is not limited in this respect.

The transmission of the quantized time-domain representation of the channel transfer function from multicarrier receiving station 100 (i.e., as a mobile station) to the base station reduces the amount of processing required by the mobile station to provide channel feedback information, because, for example, the mobile station does not have to generate an entire channel transfer function matrix. The transmission of the quantized time-domain representation of the channel transfer function also reduces the amount of feedback reducing bandwidth consumption.

In some embodiments, multicarrier receiving station 100 may comprise circuitry to generate initial sampled channel impulse response estimate 123 for each channel path between the mobile station and the base station. Initial sampled channel impulse response estimate 123 may comprise a plurality of rays for each channel path. Each ray may be associated with a delay and may have an amplitude component and a phase component. In some embodiments, the delay associated with each ray may correspond to a sample time of the associated sampled impulse response. In some embodiments, multicarrier receiving station 100 may include channel estimator 120 to generate initial channel transfer function estimate 121 from frequency-domain samples 107. Multicarrier receiving station 100 may also include inverse Fourier transform (IFT) circuitry 122 to perform an inverse Fourier transformation on initial channel transfer function estimate 121 to generate initial sampled channel impulse response estimate 123. In some embodiments, FT circuitry 106 may be reused for IFT circuitry 122.

In some embodiments, channel estimator 120 may generate initial channel transfer function estimate 121 from orthogonal training symbols or preambles transmitted by the base station on different transmit antennas. In some embodiments, the orthogonal training symbols may comprise known training symbols transmitted on the different transmit antennas at different times. In other embodiments, the orthogonal training symbols may comprise known training symbols of different frequencies transmitting on the different transmit antennas simultaneously.

Multicarrier receiving station 100 also includes ray selector 124 to select, for each channel path, most significant rays from initial sampled channel impulse response estimate 123. The selected rays may be viewed as a time-domain representation of the channel transfer function. Multicarrier receiving station 100 may also include optimizer 126 to optimize values of the selected significant rays and to calculate optimized time-domain representation $(A_{ij})$ 127 of the channel transfer function for the selected rays. Multicarrier receiving station 100 may also include quantizer 128 to quantize optimized time-domain representation 127 to generate quantized time-domain representation 130 of the channel transfer function for sending to a base station.

In some embodiments, when optimizer 126 calculates optimized time-domain representation 127 of the channel transfer function for the selected rays, a mean-square-error (MSE) of the new channel transfer function may be minimized by a comparison with initial channel transfer function estimate 121 in the frequency domain. The new channel transfer function, for example, may be calculated by an inverse Fourier transformation of the time-domain representation $(A_{ij})$, although the scope of the invention is not limited in this respect. In some embodiments, the initial time-domain estimate of the channel transfer function (e.g., corresponding to initial sampled channel impulse response estimate 123) may be calculated by performing an inverse Fourier transformation on an initial frequency-domain channel transfer function estimate (e.g., channel transfer function estimate 121) using subcarrier frequencies of subcarriers of a multicarrier communication channel.

In some embodiments, a predetermined number of the most significant rays may be selected by ray selector 124. The predetermined number may range from two rays to four rays, although in some embodiments, more than four rays may be selected. In some embodiments, the selected rays may have the greatest amplitudes, although the scope of the invention is not limited in this respect. In some embodiments, quantizer 128 may represent the associated delay, the amplitude component, and the phase component of each the selected rays of the sampled channel impulse response by a predetermined number of bits. This is discussed in more detail below.

Figure 3:
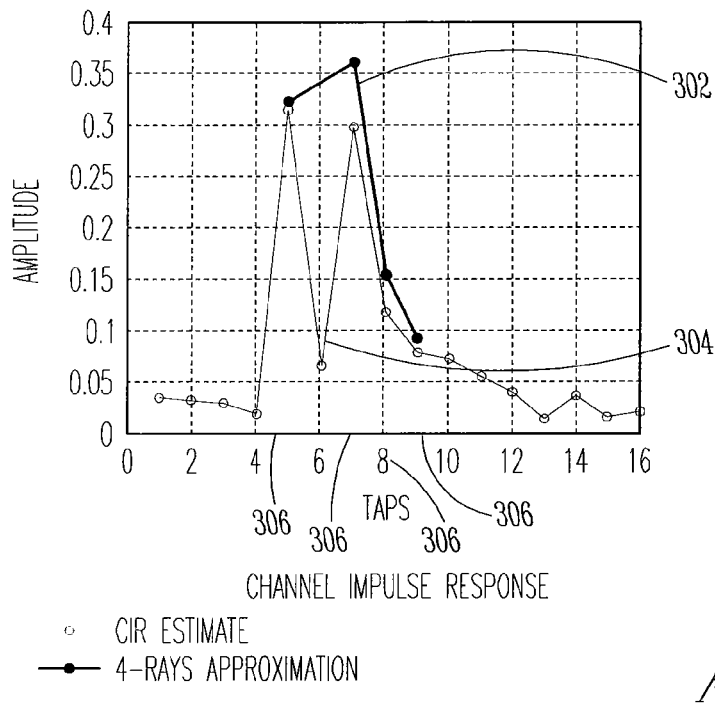
FIG. 3 illustrates a comparison between an initially estimated channel impulse response and an approximated channel impulse response in accordance with some embodiments of the present invention.

FIG. 3 illustrates a comparison between an initially estimated channel impulse response and an approximated channel impulse response in accordance with some embodiments of the present invention. FIG. 3 shows initially estimated channel impulse response 304 and approximation 302 of the channel impulse response using four selected rays 306. In this example, a mean-square-error (MSE) criterion in the frequency domain was used for generating approximation 302. Selected rays 306 may be some of the more significant rays in the sampled channel impulse response and in this example, correspond to tap numbers 5, 7, 8 and 9. Each tap may be associated with a delay which may depend on the sample time. In some embodiments, estimated channel impulse response 304 may correspond to initial sampled channel impulse response estimate 123 (FIG. 1).

In some embodiments, the base station and the mobile station may comprise at least part of a multiple-input multiple-output (MIMO) orthogonal frequency division multiplexed (OFDM) multicarrier communication system. The base station may include at least two transmit antennas and the mobile station may include at least two receive antennas defining the channel paths therebetween. In these embodiments, ray selector 124 may select significant rays 306, optimizer 126 may optimize values of the significant rays and quantizer 128 may calculate and quantize the time-domain representation of the channel transfer function for each channel path to generate quantized time-domain representation 130 of the channel transfer function for the communication channel.

After receipt of the quantized time-domain representation of the channel transfer function from the mobile station, the base station may perform a Fourier transformation on the quantized time-domain representation of the channel transfer function to generate a channel transfer function matrix (H) for each subcarrier. The base station may further perform singular value decompositions (SVD) on the channel transfer function matrices to generate the beamforming coefficients for use by the base station in generating signals for the transmit antennas for communications with the mobile station.

Figure 4:
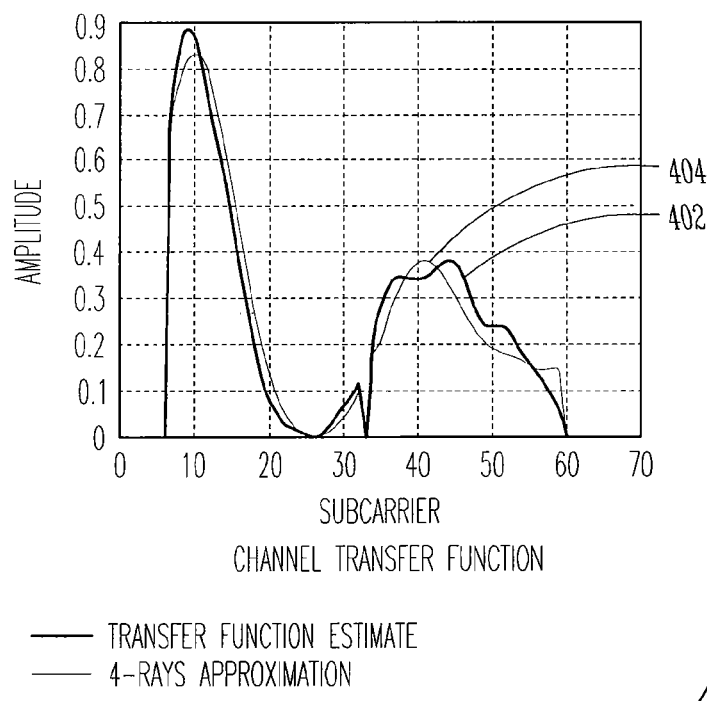
FIG. 4 illustrates a comparison between an initially estimated channel transfer function and an approximated channel transfer function in accordance with some embodiments of the present invention.

FIG. 4 illustrates a comparison between an initially estimated channel transfer function and an approximated channel transfer function in accordance with some embodiments of the present invention. Approximated channel transfer function 404 may be generated by the base station from the quantized time-domain representation of a channel transfer function sent by the mobile station. Approximated channel transfer function 404, in this example, may be generated using a quantized representation of four most signification of rays 306 (FIG. 3). As illustrated, approximated channel transfer function 404 is close to estimated channel transfer function 402, which may have been generated with more precise data (i.e., without the quantization process described herein).

Referring to FIG. 2, multicarrier transmitting station 200 may include encoder 202 to encode bit stream 201 and bit stream splitter 204 to generate two or more bit streams 205. In some embodiments, encoder 202 may be an FEC encoder, while in other embodiments; encoder 202 may be convolutional encoder. In some embodiments, each bit stream 205 may be associated with a separate spatial data stream which may be transmitted to a mobile station.

Multicarrier transmitting station 200 may also include interleavers 206 to perform interleaving operations, such as block interleaving operations, on each of bit streams 205. Multicarrier transmitting station 200 may also include mappers 208 to map bits of the interleaved bit streams to symbols and associate the symbols with the subcarriers of the multicarrier communication channel. In some embodiments, mappers may generate frequency-domain symbol-modulated subcarriers 209.

Multicarrier transmitting station 200 may also include transmit beamformers 210 to operate on frequency-domain symbol-modulated subcarriers 209 based on beam-forming coefficients 223. Multicarrier transmitting station 200 may also include inverse Fourier transform (IFT) circuitry 212 which may perform an inverse Fourier transformation on frequency-domain symbol-modulated subcarriers 211 to generate time-domain samples 213. In some embodiments, IFT circuitry 212 may perform inverse fast Fourier transformations (IFFT), although the scope of the invention is not limited in this respect.

Multicarrier transmitting station 200 may also include RF and digital to analog conversion (DAC) circuitry 214 to digitize time-domain samples 213 and generate RF signals for transmission by antennas 216. In some embodiments, RF and DAC circuitry 214 may add a cyclic prefix to symbols of multicarrier packets, although the scope of the invention is not limited in this respect.

In some embodiments, multicarrier transmitting station 200 may also include receive beamformers in its receiver portion and may use beamforming coefficients 223 for receipt of multicarrier signals from the mobile station. In these embodiments, the receiver portion of multicarrier transmitting station 200 may be similar to the elements of multicarrier receiving station 100 (FIG. 1) and the receive beamformers by be provided in the frequency-domain signal path prior to equalizer 108.

In some embodiments, multicarrier transmitting station 200 receives quantized time-domain representation 230 of a channel transfer function from a mobile station and for use in generating beamforming coefficients 223. Multicarrier transmitting station 200 may include inverse Fourier transform (IFT) circuitry 220 to perform an inverse Fourier transformation on the quantized time-domain representation of the channel transfer function to generate channel transfer function matrix (H) 221 for each subcarrier of a multicarrier communication channel. Multicarrier transmitting station 200 may also include singular value decomposition (SVD) circuitry 222 to perform singular value decompositions on channel transfer function matrices 221 to generate beamforming coefficients 223. Beamformers 210 may apply beamforming coefficients 223 to frequency-domain samples 209. Applying beamforming coefficients 223 may include weighting the complex components of signals represented by frequency-domain samples 209.

Although multicarrier stations 100 and 200 are illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of may refer to one or more processes operating on one or more processing elements. In some embodiments, the operations illustrated by the functional elements illustrated in FIGS. 1 and 2 may be performed in a different order than the order illustrated. In some embodiments, receiving station 100 and transmitting station 200 may include system controller circuitry (not separately illustrated) to assign parameters and coordinate operations therein.

FIG. 5 is a flow chart of a channel feedback procedure in accordance with some embodiments of the present invention. Procedure 500 may be performed by a MIMO multicarrier communication system to generate channel feedback information for use by a base station. In some embodiments, operations 502 through 510 may be performed by a mobile station, and operations 512 through 514 may be performed by the base station. It should be noted that the terms base station and mobile station are used for convenience to designate the functions being performed, and that in some embodiments, the terms base station and mobile station may be used interchangeably.

Operation 502 comprises generating an initial sampled channel impulse response estimate for each channel path between a base station and a mobile station. The channel paths may include the signal paths between each transmit and receive antenna combination. In some embodiments, operation 502 may include performing an IFT on a frequency-domain channel estimate to generate an initial estimate of the sampled channel impulse response and some embodiments may include generating an initial time-domain channel estimate. In some embodiments, operation 502 may be performed by channel estimator 120 (FIG. 1), IFT circuitry 122 (FIG. 1), and/or FT circuitry 106 (FIG. 1) to generate initial sampled channel impulse response estimate 123 (FIG. 1). The initial sampled channel impulse response estimate may comprise a plurality of rays for each channel path, and each ray may be associated with a delay and may have an amplitude component and a phase component.

Operation 504 comprises selecting the most significant predetermined number of rays from the estimated sampled channel response. In some embodiments, operation 504 may be performed by ray selector 124 (FIG. 1). The selected most significant rays may be viewed as a time-domain representation of the channel transfer function ($A_{ij}$).

Operation 506 comprises calculating an optimized time-domain representation of the channel transfer function ($A_{ij}$) for the selected most significant rays. In some embodiments, when the optimized time-domain representation ($A_{ij}$) of the channel transfer function is calculated for the selected rays, a mean-square-error (MSE) criterion for the optimal channel transfer function approximation in the frequency domain may be exploited, although the scope of the invention is not limited in this respect. In some embodiments, operation 506 may be performed by optimizer 126 (FIG. 1).

Operation 508 comprises quantizing the optimized time-domain representation of the channel transfer function ($A_{ij}$). In some embodiments, operation 508 comprises representing each of the associated delay, the amplitude component, and the phase component of the selected rays of the optimized time-domain representation of the channel transfer function ($A_{ij}$) by a predetermined number of bits. In some embodiments, the quantized time-domain representations (complex values $A_{ij}$) of the channel transfer function may reduce the number of bits transmitted to a base station from the mobile station. This quantization may be a rough or coarse quantization with fewer bits (e.g., 4 instead of 12). In these embodiments, the complex values of $A_{ij}$ (amplitudes and phases) may be quantized. Some example embodiments are discussed in more detail below. In some embodiments, operation 508 may be performed by quantizer 128 (FIG. 1).

Operation 510 comprises sending the quantized time-domain representation ($A_{ij}$) of the channel transfer from the mobile station to the base station. In some embodiments, operation 510 may comprise sending a quantized delay, a quantized amplitude component and a quantized phase component for each selected ray for each channel path to the base station.

Operation 512 comprises performing an inverse Fourier transformation on the quantized time-domain representation ($A_{ij}$) of the channel transfer received from the mobile station to generate a channel transfer function approximation. The channel transfer function approximation may correspond to channel transfer function approximation 404 (FIG. 4). Operation 512 may be performed by IFT circuitry 220 (FIG. 2).

Operation 514 comprises performing a SVD on the channel transfer function approximation to generate beamforming coefficients. Operation 514 may be performed by SVD circuitry 222 (FIG. 2) to generate beamforming coefficients 223 (FIG. 2). The beamforming coefficients may be used by mul-ticarrier transmitting station 200 (FIG. 2) for subsequent transmissions to the mobile station.

In some embodiments, the quantized channel information received from the mobile station may be used by the base station in ways other than or in addition to generating beamforming coefficients. For example, the quantized channel information may be used for adaptive bit-loading and power loading techniques per subcarrier and/or per spatial channel.

Although the individual operations of procedure 500 are illustrated and described as separate operations, one or more of the individual operations may be performed concurrently, and nothing requires that the operations be performed in the order illustrated.

Referring to FIGS. 1 and 2, in some embodiments, multicarrier receiving station 100 and multicarrier transmitting station 200 may comprise a MIMO-OFDM system with $N_{tx}$ transmit antennas and $N_{rx}$ receive antennas. The received signal at each subcarrier may be represented as a follows:

$$r(k)=H(k)s(k)+n(k) \quad (1)$$

where k=1, ..., $N_{sc}$ represents the subcarrier number, $r(k)=\{r_1(k), r_2(k), \ldots r_{Nrx}(k)\}^T$ is a received signal vector at the k-th subcarrier, H(k) is a $N_{rx} \times N_{tx}$ channel transfer matrix for k-th subcarrier which may depend on the subcarrier number, $s(k)=\{s_1(k), s_2(k), \ldots s_{Ntx}(k)\}^T$ is a transmit signal vector and n(k) is a noise vector. In a conventional 2×2, 20-MHz bandwidth MIMO multicarrier system with 52 subcarriers, 208 (i.e., 2*2*52) complex values are transmitted to provide the channel transfer matrix information. This large amount of information consumes significant bandwidth and requires significant processing by the mobile station. In accordance with some embodiments of the present invention, a quantized time-domain representation of the channel transfer matrix may reduce the processing by the mobile station and may further reduce the feedback.

In the time-domain, each transmit/receive antenna combination may have a channel impulse response with a length that is generally less than a guard interval. The channel impulse response, sampled within a given frequency spectrum (e.g., a 20 MHz channel) may comprise several rays. In the case of a typical exponentially decaying power profile (e.g. $\tau_{rms}$=50 ns), only a few first rays generally contain the major part of signal energy. Thus, these most significant few rays of channel impulse response may be used for beamforming without a significant loss in closed-loop performance.

In some other embodiments, rays may be selected from a first few samples taken from the beginning of the channel impulse response estimates. However, the channel may be clustered and rays with more significant power may appear far from each other with large delays. Another problem with selecting rays from the first few samples is that the channel impulse response estimate may not be available, so a channel transfer function estimate may be used. The channel transfer function may be incomplete because there may be no training subcarrier symbols at the side guard bands and zero frequency. Due to this incompleteness, the Fourier transform of channel transfer function may not match the channel impulse response very well. Another problem with selecting rays from the first few samples is that symbol timing estimation algorithms may affect the first ray position in the estimated channel impulse response.

To help reduce these difficulties, some other embodiments of the present invention select significant rays to represent a smoother channel transfer function (i.e., for each pair of antennas) as a composition of complex sinusoids. As illustrated in FIG. 4, significant rays 406 are selected, which do not necessary correspond to the first few rays.

In accordance with some embodiments, a channel impulse response estimate matrix may be obtained directly via a time-domain channel estimation by channel estimator 120 or produced by a Fourier transformation of a channel transfer matrix estimate. Multicarrier receivers generally perform channel estimation in the frequency-domain, however, this estimate is sometimes incomplete since training symbols are generally transmitted only on data and pilot subcarriers, and as a result, the Fourier transform of such a channel transfer function estimate does not match channel impulse response. Some embodiments of the present invention are more robust to such distortion because the channel impulse response may be used for determining maximal rays.

In some embodiments, for each pair of transmit and receive antennas (ij), L taps with the maximal values (e.g., the L most significant rays that contain maximum signal power) are selected. The corresponding delays $d_{ij}(l)$, $l=1 \ldots L$ of the most significant ray's (positions of the rays in channel impulse response estimate) may be stored.

The time-domain representation ($A_{ij}$) of the channel transfer function may be calculated as follows to provide an approximation of $H_{ij}$ in minimum-square error-sense, by using complex exponents with frequencies of the channel:

$$\tilde{H}_{ij}(k) = \sum_{l=1}^{L} A_{ij}(l) \exp\left\{ \frac{2\pi d(l)_{ij} k}{N} + \varphi_{ij}(l) \right\}, \quad (2)$$

$$\sum_{k=1}^{N} |\tilde{H}_{ij}(k) - H_{ij}(k)|^2 \to \min, \quad (3)$$

Complex vector $A_{ij} = [A_{ij}(1) \exp\{\phi_{ij}(1)\} \ldots A_{ij}(L) \exp\{\phi_{ij}(L)\}]^T$ provided the time-domain representation of $H_{ij}$ by using the significant rays with delays $d_{ij}(n)$, and may be calculated from equations (2) and (3) as follows:

$$A_{ij} = (F^H F)^{-1} F H_{ij}. \quad (4)$$

In equation (4), F is a Fourier transform matrix for a given set of frequencies (i.e., data and pilot positions) and a given set of delays (most significant rays) and may be represented as follows:

$$F_{mn} = \exp\left\{ -j \frac{2\pi mn}{N} \right\}, \quad (5)$$

where m∈ data and pilot subcarrier index, n=$d_{ij}$ represents the most significant ray index, and $H_{ij}$ is 1×N column vector defining the channel transfer function from the i-th transmitting to the j-th receiving antenna.

In accordance with some embodiments, amplitude $A_{ij}(l)$ and phase $\phi_{ij}(l)$ may be quantized as discussed below, and bits representing significant ray delays, amplitudes and phases may be modulated, coded (e.g., using BPSK modulation with a coding rate 1/2) and transmitted as part of a signal field to the base station. At the base station, the channel transfer matrixes $H_{ij}$ may be recovered by using a Fourier transformation in accordance to the equation (2) for SVD processing.

In FIG. 3, estimated channel impulse response 302 is shown for one pair of transmit-receive antennas. Taps with numbers 5, 7, 8 and 9 are selected as the maximal rays. Time-domain approximation vector ($A_{ij}$) (i.e., estimate 304) may be calculated. In FIG. 4, corresponding channel transfer function 404 and its approximation 402 by vector $A_{ij}$ are shown.

In some embodiments, several adjustable and/or selectable parameters may be used that may affect the accuracy and amount of feedback information. Table 1 shows an example set of parameters, which may be suitable for closed loop MIMO-OFDM systems based on the IEEE 802.11a standard, although the scope of the invention is not limited in this respect.

TABLE 1

| Parameter name | Value interval (number of bits) |
| --- | --- |
| Number of significant rays | 3 or 4 |
| Significant ray index (delay) | 0, 1 , . . . , 15 (4 bits representation) |
| Ray amplitude | 0-1 (4 bits quantization) |
| Ray phase | 0-2π (4 bits quantization) |

In accordance with these embodiments, for each pair of transmit-receive antennas and using a four-significant ray representation, forty-eight bits (i.e., 4*(4+4+4)) are used for feedback.

In some embodiments, multicarrier receiving station 100 (FIG. 1) and/or multicarrier transmitting station 200 (FIG. 2) may transmit and/or receive orthogonal frequency division multiplexed (e.g., OFDM) communication signals. In some embodiments, multicarrier receiving station 100 (FIG. 1) and/or multicarrier transmitting station 200 (FIG. 2) may communicate an OFDM packet on a multicarrier communication channel. The multicarrier channel may be within a predetermined frequency spectrum and may comprise a plurality of orthogonal subcarriers. In some embodiments, the orthogonal subcarriers of a subchannel may be closely spaced OFDM subcarriers. To achieve orthogonality between closely spaced subcarriers, in some embodiments, the subcarriers of a particular multicarrier channel may have a null at substantially a center frequency of the other subcarriers of that multicarrier channel.

In some embodiments, multicarrier receiving station 100 (FIG. 1) and/or multicarrier transmitting station 200 (FIG. 2) may communicate with one or more other communication stations over the multicarrier communication channel. In some embodiments, the OFDM communication channel may comprise either a standard-throughput multicarrier channel or a high-throughput multicarrier communication channel. In these embodiments, the standard-throughput multicarrier channel may comprise one multicarrier channel and the high-throughput channel may comprise a combination of one or more multicarrier channels and one or more spatial channels associated with each multicarrier channel. Spatial channels may overlap in frequency and orthogonality may be achieved through beamforming and/or diversity.

In accordance with some embodiments, multicarrier transmitting station 200 (FIG. 2) may symbol-modulate the subcarriers in accordance with individual subcarrier modulation assignments. This may be referred to as adaptive bit loading (ABL). Accordingly, one or more bits may be represented by a symbol modulated on a subcarrier. The modulation assignments for the individual subchannel may be based on the channel characteristics or channel conditions for that subcarrier and may be generated from quantized time-domain representation 230 (FIG. 2) of the channel transfer function received from a mobile station, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with higher data communication rates per subcarrier may also be used.

In some embodiments, the frequency spectrums for a multicarrier channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier receiving station 100 (FIG. 1) and/or multicarrier transmitting station 200 (FIG. 2) may be part of a wireless communication device. In these embodiments, the wireless communication device may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier receiving station 100 (FIG. 1) and/or multicarrier transmitting station 200 (FIG. 2) may transmit and/or receive RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANS) and/or 802.16 standards for wireless metropolitan area networks (WMANs).

Antennas 102 (FIG. 1) and antennas 216 (FIG. 2) may comprise directional or omnidirectional antennas, including, for example, dipole antennas, monopole antennas, patch antennas, loop antennas, microstrip antennas or other types of antennas suitable for reception and/or transmission of RF signals by multicarrier receiving station 100 (FIG. 1) and/or multicarrier transmitting station 200 (FIG. 2).

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate embodiment.

What is claimed is:

1. A method comprising:
    generating an initial channel transfer function estimate of a orthogonal frequency division multiplexed (OFDM) communication channel for each of a plurality of channel paths between a multi-antenna mobile station and a multi-antenna base station using a frequency domain representation of received signals;
    estimating a sampled channel impulse response by performing an inverse Fourier transformation on the initial channel transfer function estimate;
    representing the estimate of the sampled channel impulse response by a plurality of rays for each of the channel paths;
    generating a quantized time-domain representation of the initial channel transfer function estimate for each of the channel paths from at least some of the rays; and
    sending the quantized time-domain representation of the initial channel transfer function estimate to the base station for use in generating beamforming coefficients for use in subsequent transmissions to the mobile station,
    wherein each ray is associated with a different delay of the estimated sampled channel impulse response for an associated channel path.

2. The method of claim 1 wherein the most significant of the rays are selected for generation of the quantized time-domain representation of the initial channel transfer function, and
    wherein a Fourier transform is performed on the received signals to generate the frequency domain representation of received signals for use in initially generating the channel transfer function estimates.

3. The method of claim 1 further comprising:
    selecting, for each channel path, the most significant rays from the estimated sampled channel impulse response;
    calculating a time-domain representation of the channel transfer function for the selected rays; and
    quantizing the time-domain representation to generate the quantized representation of the initial channel transfer function for sending to the base station.

4. The method of claim 3 wherein quantizing comprises representing each of the associated delay, the amplitude component, and the phase component of the selected rays of the estimated sampled channel impulse response by a predetermined number of bits.

5. The method of claim 3 wherein each of the channel paths is defined by a combination of transmit and receive antenna pairs, and
    wherein a communication channel between the mobile station and the base station comprises the channel paths therebetween.

6. The method of claim 5 wherein the base station and the mobile station comprise at least part of a multiple-input multiple-output multicarrier communication system, wherein the base station includes at least two transmit antennas and the mobile station includes at least two receive antennas defining the channel paths, and wherein the selecting, calculating, and quantizing are performed by the mobile station for each channel path to generate the quantized time-domain representation of the initial channel transfer function for the communication channel.

7. The method of claim 3 further comprises generating the initial channel transfer function estimate from orthogonal training symbols transmitted by the base station on different transmit antennas.

8. The method of claim 3 wherein after receipt of the quantized time-domain representation of the initial channel transfer function from the mobile station, the base station performs a Fourier transformation on the quantized time-domain representation of the initial channel transfer function to generate a channel transfer function matrix, the channel transfer function matrix being generated for each subcarrier.

9. The method of claim 8 wherein the base station further performs singular value decompositions on the channel transfer function matrices to generate the beamforming coefficients for use by the base station in generating signals for a plurality of transmit antennas.

10. A multicarrier mobile station comprising:

a channel estimator to generate an initial channel transfer function estimate of a orthogonal frequency division multiplexed (OFDM) communication channel for each of a plurality of channel paths between a multi-antenna mobile station and a multi-antenna base station using a frequency domain representation of received signals;

inverse Fourier transform circuitry to estimate a sampled channel impulse response performing an inverse Fourier transformation on the initial channel transfer function estimate;

circuitry to generate a quantized time-domain representation of the initial channel transfer function estimate; and circuitry to send the quantized time-domain representation of the initial channel transfer function to a base station for use by the base station in generating beamforming coefficients for use in subsequent transmissions to the mobile station, wherein the circuitry to generate the quantized time-domain representation represents the estimate of the sampled channel impulse response by a plurality of rays for each of the channel paths, wherein each ray is associated with a different delay of the estimated sampled channel impulse response for an associated channel path, and wherein the quantized time-domain representation is generated from some of the rays.

11. The mobile station of claim 10 further comprising Fourier transform circuitry to perform a Fourier transform on the received signals to generate the frequency domain representation of received signals for use in initially generating the channel transfer function estimates, wherein each ray has a delay component, an amplitude component and a phase component.

12. The mobile station of claim 11 comprising:

a ray selector to select, for each channel path, most significant rays from the sampled channel impulse response and to calculate a time-domain representation of the channel transfer function for the selected rays; and a quantizer to quantize the time-domain representation to generate the quantized representation of the channel transfer function for sending to the base station.

13. The mobile station of claim 12 wherein the quantizer is to represent each of the associated delay, the amplitude component, and the phase component of the selected rays of the sampled channel impulse response by a predetermined number of bits.

14. The mobile station of claim 12 wherein each of the channel paths is defined by a combination of transmit and receive antenna pairs, wherein a communication channel between the mobile station and the base station comprises the channel paths therebetween.

15. The mobile station of claim 14 wherein the base station and the mobile station comprise at least part of a multiple-input multiple-output multicarrier communication system, wherein the base station includes at least two transmit antennas and the mobile station includes at least two receive antennas defining the channel paths, and wherein the ray selector selects significant rays and the quantizer quantizes time-domain representation of the channel transfer function for each channel path to generate the quantized time-domain representation of the initial channel transfer function for the communication channel.

16. The mobile station of claim 12 wherein the channel estimator generates the initial channel transfer function estimate from orthogonal training symbols transmitted by the base station on different transmit antennas.

17. The mobile station of claim 12 wherein after receipt of the quantized time-domain representation of the initial channel transfer function from the mobile station, the base station is to perform a Fourier transformation on the quantized time-domain representation of the initial channel transfer function to generate a channel transfer function matrix, the channel transfer function matrix being generated for each subcarrier.

18. The mobile station of claim 17 wherein the base station is to further perform singular value decompositions on the channel transfer function matrices to generate the beamforming coefficients for use by the base station in generating signals for a plurality of transmit antennas.

19. A computer-readable medium that stores instructions for execution by one or more processors, which when executed, cause the one or more processors to send a quantized time-domain representation of an initial channel transfer function from a mobile station to a base station for use by the base station in generating beamforming coefficients for use in subsequent transmissions to the mobile station, wherein the execution of the instructions result in:

generating the initial channel transfer function estimate of a orthogonal frequency division multiplexed (OFDM) communication channel for each of a plurality of channel paths between a multi-antenna mobile station and a multi-antenna base station using a frequency domain representation of received signals;

estimating a sampled channel impulse response by performing an inverse Fourier transformation on the channel transfer function estimate;

representing the estimate of the sampled channel impulse response by a plurality of rays for each of the channel paths, and generating a quantized time-domain representation of the initial channel transfer function estimate for each of the channel paths from at least some of the rays, wherein each ray is associated with a different delay of the estimated sampled channel impulse response for an associated channel path.

20. A computer-readable medium of claim 19 wherein each ray has a delay component, an amplitude component and a phase component, and wherein a Fourier transform is performed on the received signals to generate the frequency domain representation of received signals for use in initially generating the channel transfer function estimates.

* * * * *

UNITED STATES PATENT AND TRADEMARK OFFICE
CERTIFICATE OF CORRECTION

PATENT NO. : 7,649,861 B2  Page 1 of 1
APPLICATION NO. : 10/999592
DATED : January 19, 2010
INVENTOR(S) : Maltsev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Twenty-eighth Day of December, 2010

David J. Kappos
*Director of the United States Patent and Trademark Office*